United States Patent
Netz et al.

(10) Patent No.: US 7,873,669 B2
(45) Date of Patent: Jan. 18, 2011

(54) DIRECT WRITE BACK SYSTEMS AND METHODOLOGIES

(75) Inventors: Amir Netz, Bellevue, WA (US); Alexander Berger, Sammamish, WA (US); Mosha Pasumansky, Redmond, WA (US); Richard R. Tkachuk, Sammamish, WA (US); Cristian Petculescu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 276 days.

(21) Appl. No.: 11/137,232

(22) Filed: May 25, 2005

(65) Prior Publication Data

US 2006/0010143 A1 Jan. 12, 2006

Related U.S. Application Data

(60) Provisional application No. 60/586,501, filed on Jul. 9, 2004.

(51) Int. Cl.
 G06F 7/00 (2006.01)
 G06F 17/30 (2006.01)
(52) U.S. Cl. ............... 707/796; 707/717; 707/778; 707/802
(58) Field of Classification Search ............ 707/796, 707/802
 See application file for complete search history.

(56) References Cited

U.S. PATENT DOCUMENTS 5,359,724 A * 10/1994 Earle .................. 707/205
5,918,232 A * 6/1999 Pouschine et al. ....... 707/103 R
5,940,818 A 8/1999 Malloy et al.
5,978,788 A * 11/1999 Castelli et al. ............. 707/2
6,189,004 B1 2/2001 Rassen et al.
6,205,447 B1 * 3/2001 Malloy ................. 707/102
6,212,524 B1 4/2001 Weissman et al.
6,223,171 B1 * 4/2001 Chaudhuri et al. ........ 707/2
6,317,750 B1 11/2001 Tortolani et al.
6,434,544 B1 8/2002 Bakalash
6,542,895 B1 * 4/2003 DeKimpe et al. ....... 707/101
6,578,028 B2 6/2003 Egilsson
6,651,055 B1 11/2003 Kilmer et al.
6,721,760 B1 4/2004 Ono et al.
6,775,675 B1 8/2004 Nwabueze et al.

(Continued)

OTHER PUBLICATIONS

Wil Blake et al. "Delta Service in a Mobiel File System Client Cache," 1998 IEEE, pp. 222-228.*

(Continued)

*Primary Examiner*—John R. Cottingham
*Assistant Examiner*—Hexing Liu
(74) *Attorney, Agent, or Firm*—Workman Nydegger

(57) ABSTRACT

Provided are systems and methods that facilitate direct write back in a multi-dimensional database. The system includes a delta cache component that receives a user request to change an original cell value and determines a delta value based at least in part upon the changed cell value. Also included is a write back partition component that selectively updates a data cell based at least in part upon the delta value without updating corresponding data cell values. The system and methods allow attributes to be added to any dimension of a cube without affecting the write back data. Adding, modifying or removing a hierarchy has no affect on write back data nor does deleting a dimension that is not referenced by a write back.

15 Claims, 10 Drawing Sheets

U.S. PATENT DOCUMENTS

| | | | |
|---|---|---|---|
| 6,877,006 B1 | 4/2005 | Vasudevan | |
| 6,901,406 B2 | 5/2005 | Nabe et al. | |
| 6,970,874 B2 | 11/2005 | Egilsson et al. | |
| 7,562,086 B2 | 7/2009 | Mirchandani | |
| 2002/0087633 A1 | 7/2002 | Nelson | |
| 2002/0087686 A1 | 7/2002 | Cronk | |
| 2002/0099692 A1 | 7/2002 | Shah | |
| 2004/0059724 A1 | 3/2004 | Petculescu et al. | |
| 2004/0215626 A1 | 10/2004 | Colossi | |
| 2004/0225692 A1* | 11/2004 | Pasumansky et al. | 707/200 |
| 2005/0010565 A1 | 1/2005 | Cushing | |
| 2005/0065939 A1 | 3/2005 | Miao | |
| 2005/0076067 A1 | 4/2005 | Bakalash et al. | |
| 2005/0283488 A1 | 12/2005 | Colossi | |
| 2006/0010113 A1 | 1/2006 | Berger | |

OTHER PUBLICATIONS

OA dated Jan. 26, 2009 for U.S. Appl. No. 11/167,413, 25 pages.
Office Action dated Sep. 19, 2007 cited in U.S. Appl. No. 11/167,413.
Office Action dated Mar. 5, 2008 cited in U.S. Appl. No. 11/167,413.
Office Action dated Aug. 11, 2008 cited in U.S. Appl. No. 11/167,413.
Notice of Allowance dated Apr. 13, 2009 cited in U.S Appl. No. 11/167,413.
Office Action dated Jul. 3, 2007 cited in U.S. Appl. No. 11/135,718.
Office Action dated Jan. 2, 2008 cited in U.S. Appl. No. 11/135,718.
Office Action dated Apr. 2, 2008 cited in U.S. Appl. No. 11/135,718.
Office Action dated Oct. 3, 2008 cited in U.S. Appl. No. 11/135,718.
Office Action dated Apr. 9, 2009 cited in U.S. Appl. No. 11/135,718.
Office Action dated Nov. 12, 2009 cited in U.S. Appl. No. 11/135,718.
U.S. Appl. No. 11/135,718, filed Jul. 19, 2010, Notice of Allowance.

* cited by examiner

DIRECT WRITE BACK SYSTEMS AND METHODOLOGIES

CROSS-REFERENCE TO RELATED APPLICATIONS

This application claims the benefit of U.S. Provisional Application Ser. No. 60/586,501, filed Jul. 9, 2004, entitled "SYSTEMS AND METHODS THAT FACILITATE USAGE OF DATABASES." The entirety of this application is incorporated herein by reference.

BACKGROUND OF THE INVENTION

Data warehousing and online analytical processing (OLAP) are widespread technologies employed to support business decisions and data analysis. A data warehouse is a nonvolatile repository for an enormous volume of organizational or enterprise information (e.g., 100 MB-TB). These data warehouses are populated at regular intervals with data from one or more heterogeneous data sources, for example from multiple transactional systems. This aggregation of data provides a consolidated view of an organization from which valuable information can be derived. Though the sheer volume can be overwhelming, the organization of data can help ensure timely retrieval of useful information.

Data warehouse data is often stored in accordance with a multidimensional database model. Conceptually in multidimensional database systems, data is represented as cubes with a plurality of dimensions and measures, rather than relational tables with rows and columns. A cube includes groups of data such as three or more dimensions and one or more measures. Dimensions are a cube attribute that contains data of a similar type. Each dimension has a hierarchy of levels or categories of aggregated data. Accordingly, data can be viewed at different levels of detail. Measures represent real values, which are to be analyzed. The multidimensional model is optimized to deal with large amounts of data. In particular, it allows users to execute complex queries on a data cube. OLAP is almost synonymous with multidimensional databases.

OLAP is a key element in a data warehouse system. OLAP describes a category of technologies or tools utilized to retrieve data from a data warehouse. These tools can extract and present multidimensional data from different points of view to assist and support managers and other individuals examining and analyzing data. The multidimensional data model is advantageous with respect to OLAP as it allows users to easily formulate complex queries, and filter or slice data into meaningful subsets, among other things. There are two basic types of OLAP architectures MOLAP and ROLAP. MOLAP (Multidimensional OLAP) utilizes a true multidimensional database to store data. ROLAP (Relational OLAP) utilizes a relational database to store data but is mapped so that an OLAP tool sees the data as multidimensional. HOLAP (Hybrid OLAP) is an amalgam of both MOLAP and ROLAP.

Write back allows manipulation of data for "what-if" analysis and queries without altering the original data and without corrupting or modifying such data, allowing others to rely on the original data. When write back is applied to the lowest or leaf level of a cell, the write back information is aggregated to the other members of that level as well as a higher level, which contains aggregate data from the lower level cells. The aggregation of data can slow down system performance and, in some circumstances, aggregation is not desired. Therefore, what is needed is a system and method for facilitating write back without affecting other cells in the cube or destroying the integrity of the cell data while improving system performance.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention extends MDX to update any cell in a cube and allows updating at a higher granularity. According to an aspect is a system that facilitates direct write back in a multi-dimensional database. The system includes a delta cache component that receives a user request to change an original cell value and determines a delta value based at least in part upon the changed cell value. The system further includes a write back partition component that selectively updates a data cell based at least in part upon the delta value without updating corresponding data cell values. The write back partition maintains original data cell information. The delta value is the difference between the changed cell value and the original cell value and can be maintained at a session level without updating cell values at a storage level. The corresponding data cell values are aggregate values located at higher dimensions in a cube hierarchy, at lower dimensions in a cube hierarchy, and/or at the same dimension level in a cube hierarchy. The system can further include a write back storage component that repopulates the cube with the delta value(s).

According to another aspect of the invention is a method for facilitating write back to a data cube. The method includes receiving a cell data value, determining a delta value, updating the cell data value independently from other cell data values, and outputting the result of the delta value to a user. Determining a delta value is associated with the difference between an original value and the received cell value. Updating the cell data value independently from other cell data values does not affect cells at a higher, lower and/or same level in a cube hierarchy. The result outputted to the user is in the form of a "what if" query. The method can also include associating related data with the delta value and storing the delta value and associated data in a session cache. The related data is one of a user identification, a time stamp, and a system identification. The method can further include deleting the delta value and returning the cell data value to an original value.

The following description and the annexed drawings set forth in detail certain illustrative aspects of the invention. These aspects are indicative, however, of but a few of the various ways in which the principles of the invention may be employed and the invention is intended to include all such aspects and their equivalents. Other advantages and novel features of the invention will become apparent from the following detailed description of the invention when considered in conjunction with the drawings.

DESCRIPTION OF THE INVENTION

Figure 1:
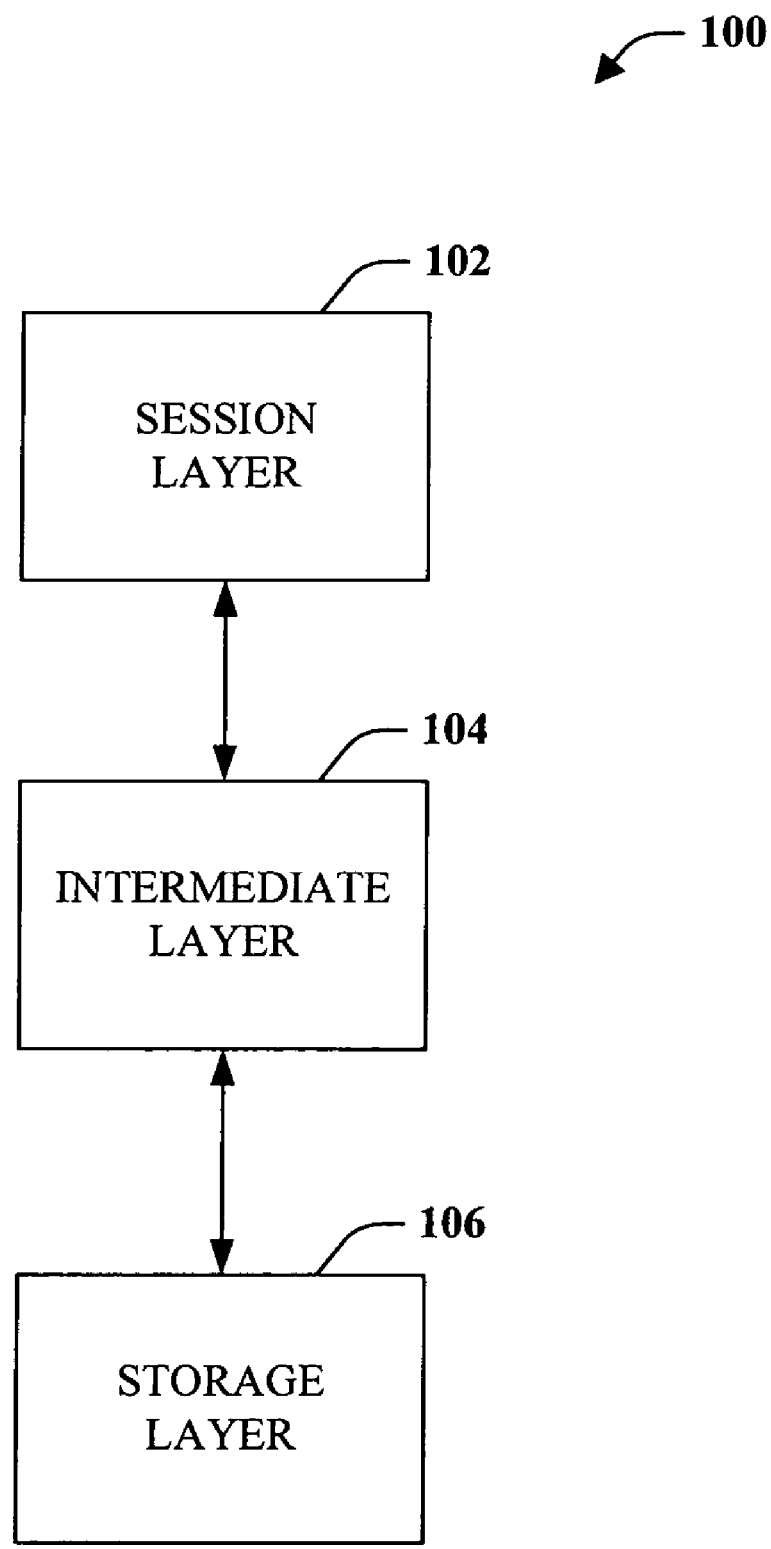
FIG. 1 illustrates a block diagram of a system that facilitates direct write back in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the invention. It may be evident, however, that the invention may be practiced without these specific details. In other instances, well-known structures and devices are shown in block diagram form in order to facilitate describing the invention.

As used in this application, the terms "component," "system," "engine," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Artificial intelligence based systems (e.g., explicitly and/or implicitly trained classifiers) can be employed in connection with performing inference and/or probabilistic determinations and/or statistical-based determinations as in accordance with one or more aspects of the subject invention as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Referring now to FIG. 1, illustrated is a high-level system 100 that facilitates direct write back according to an aspect of the subject invention. Write back is the ability to write information to a write-enabled cube and allows a user and/or entity to alter, change, delete, add, and/or manipulate data and/or measurement values without such alterations, changes, etc. repopulating the cube until the system is instructed to do so by the user and/or entity.

Cubes are multi-dimensional objects that contain values and/or measurements whose coordinates are specified by dimensions. The dimension is a cube's structural attribute that contains members of a similar type that relate to the user's perception of the cube data. A dimension typically has an associated hierarchy and is populated from a lowest or leaf level, which contains the greatest granularity or detail of data. Upper levels, or those levels above the leaf level, in the hierarchy are associated with lower granularity or less detail, and more aggregated data. For example, a simple hierarchy can have at its lowest or leaf level time measured in seconds with the hierarchy progressing upward with the next level associated with minutes, the next level hours, then days, weeks, years, etc. Each progressively higher dimension contains a lower level of detail than the preceding lower dimension level.

Write back allows the user and/or entity to perform a "what-if" analysis on the data and/or measurement values without altering the original data. This provides others, that have access to the cube data, the ability and assurance necessary to rely upon the original data and/or perform their own manipulations on the original data/measurements at a substantially similar time without regard to anyone else's "what-if" analysis being performed on similar data.

Direct write back is the ability to update at a higher granularity level (e.g. leaf level) rather than at the same granularity or scope as the fact table that is perceived by the user. For example, in a budgeting application, budgets are generally made at a high level, such as by organizational department and/or art unit. The budget can be based upon the overall monetary requirements of such department and/or unit. However, the data underlying the budgeting application is gathered from data sources at a much finer granularity level, such as costs associated with obtaining office supplies, materials, salaries, training, etc. This cost data would be entered at the leaf level and the system would aggregate that data up to the department level. If a user wants to manipulate data at the lower granularity level to determine a "what-if" situation a measurement lower on the hierarchy is made and direct write back allows a change at this level without affecting the other level members and without the system aggregating the data to a higher level or dimension in the hierarchy.

With continuing reference to FIG. 1, to facilitate direct write back the system 100 includes at least three layers: a session layer 102, an intermediate layer 104, and a storage layer 106. The session layer 102 is the level where the write back process or manipulation of data occurs through an interface with a user and/or entity. Changes made on the system layer 102 affect only the particular user and are not propagated to a server or storage layer 106, thus other users are not affected by the manipulated data and can rely upon the data. The intermediate layer 104 includes at least one cache that stores the data being manipulated allowing the server to respond to a query based on the write back data when the changes are distributed to a server cache. The storage layer 106 allows the data propagated to relational storage mode to be used to update a server cache.

In accordance with an aspect of the invention, it should be appreciated that system 100 can provide for direct write back with respect to an OLAP system or engine and more specifically with respect to a multidimensional OLAP engine, a multidimensional database management system, or portions thereof. In particular, system 100 can be incorporated into a multidimensional OLAP engine, for example, to facilitate direct write back and/or update of a database, data warehouse, or structures comprising a database or data warehouse (e.g., multidimensional objects, cubes . . . ).

Figure 2:
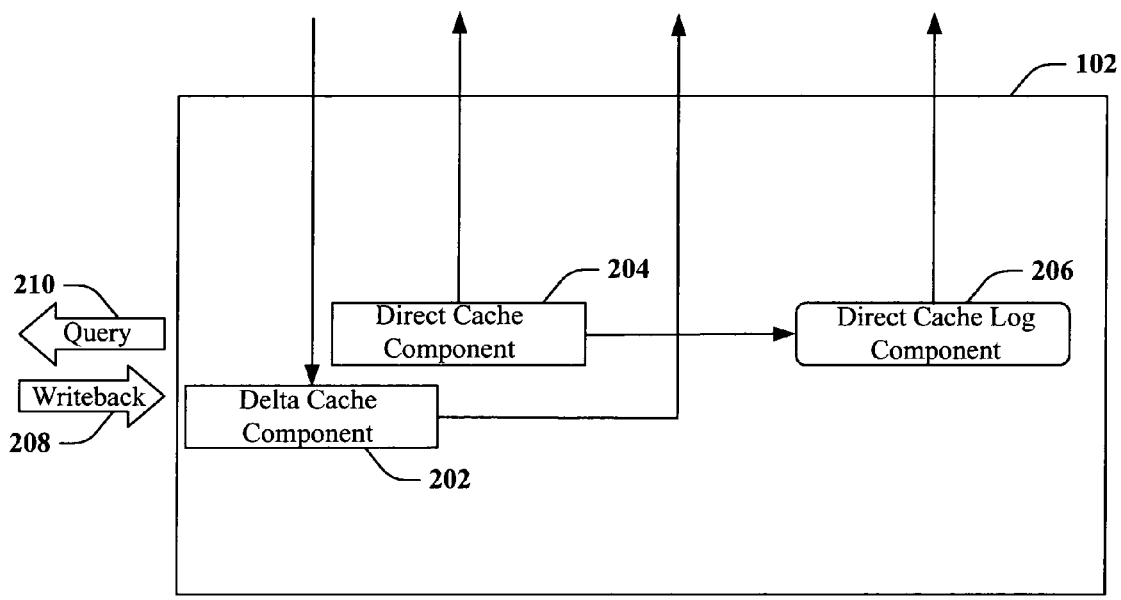
FIG. 2 illustrates a block diagram of session layer components that facilitate direct write back in accordance with an aspect of the invention.

FIG. 2 illustrates in greater detail the session layer 102 and associated components of system 100 that facilitate direct write back according to an aspect of the invention. Session layer 102 can include a delta cache component 202, a direct cache component 204, and a direct cache log component 206. The delta cache component 202 receives original cell data information from a regular cache associated with an intermediate layer. When the session layer 102 receives an input, in the form of a write back 208, from a user and/or entity, that data is stored or maintained in the delta cache as deltas, or changes, from the original cell data and/or measurement value. For example, if the original cell measurement value is 1000 and a write back changes such value to 900, the delta value is –100. The formula is (delta value)=(new value)–(old value). The delta value is the value maintained in the delta cache 202.

It is appreciated that the information in the delta cache component 202 is viewable and/or accessible only by the user and/or entity associated with such session layer 102. Other users and/or entities that may be manipulating and/or using the original cell data and/or measurement value at a substantially similar time are not affected by the information in the delta cache component 202. If the session layer 102 is terminated, the information in the delta cache component 202 is likewise terminated, deleted, or otherwise removed from the delta cache component 202. The delta information maintained in the delta cache component 202 is communicated and expressed as deltas in a write back partition associated with a storage layer.

The direct cache component 204 includes a registry base, data cache(s) and a decoding table for cube dimension information. The direct cache component 204 can output associated information to a direct cache log component 206 that maintains a log of the manipulated data. The log can include the original cell measurement value, a time stamp that indicates when the data was altered, a user identification that indicating who altered the data, a system identification, etc.

The deltas can be deleted through the direct cache log component 206 restoring the data/measurements to original form. Alternatively and/or additionally, each delta in the sequence can be individually deleted to return to a previously changed value to manipulate the data further. In this way, the user can restore the data to its original value(s) and/or any preceding changed values without accessing the intermediate layer and/or storage layer components.

In accordance with another aspect of the invention, session level 102 does not have a direct cache log component 206 associated with the direct cache component 204 allowing the system to update storage immediately. It is also understood that the delta cache component 202 can have an associated log, allowing a lazy update of storage for both the delta cache 202 and the direct cache 204.

Based upon the write back information 208 received by the system 100, the delta is determined and a query 210 is output to the associated user and/or entity in the form of a "what-if" query. That is to say, the user and/or entity can change the values to determine the result of such values without actually changing the underlying data. This allows manipulation of the data without corrupting or affecting the original data and without affecting other users that may be using the information at a substantially similar time.

Figure 3:
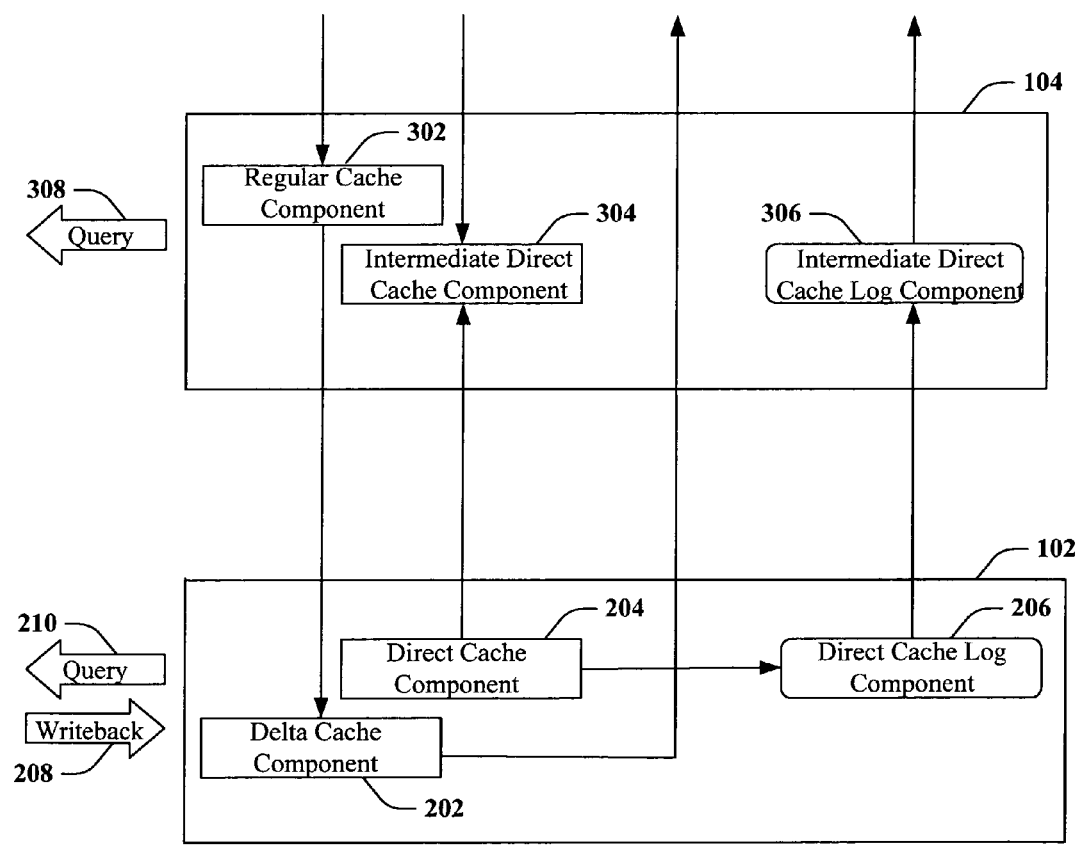
FIG. 3 illustrates a block diagram of intermediate layer components in accordance with an aspect of the invention.

FIG. 3 illustrates various components associated with the intermediate layer 104 of system 100 that facilitates direct write back in accordance with an aspect of the invention. The intermediate layer 104 interfaces with the session layer 102 and includes a regular cache component 302, an intermediate direct cache component 304 and an intermediate direct cache log component 306. The intermediate regular cache component 302 receives original data and/or measurements stored on the storage level and outputs the data to the delta cache component 202 of the session layer 102 allowing manipulation of the data on the session layer 102. The intermediate direct cache component 304 receives data from the direct cache component 204 and from storage layer 106 component(s). The intermediate direct cache log component 306 receives data from the direct cache log component 206 associated with the session layer 102 and interfaces with the storage layer to facilitate processing of the data. The intermediate layer 104 can output query information 308 relating to a "what if" query without affecting data at the storage level.

Figure 4:
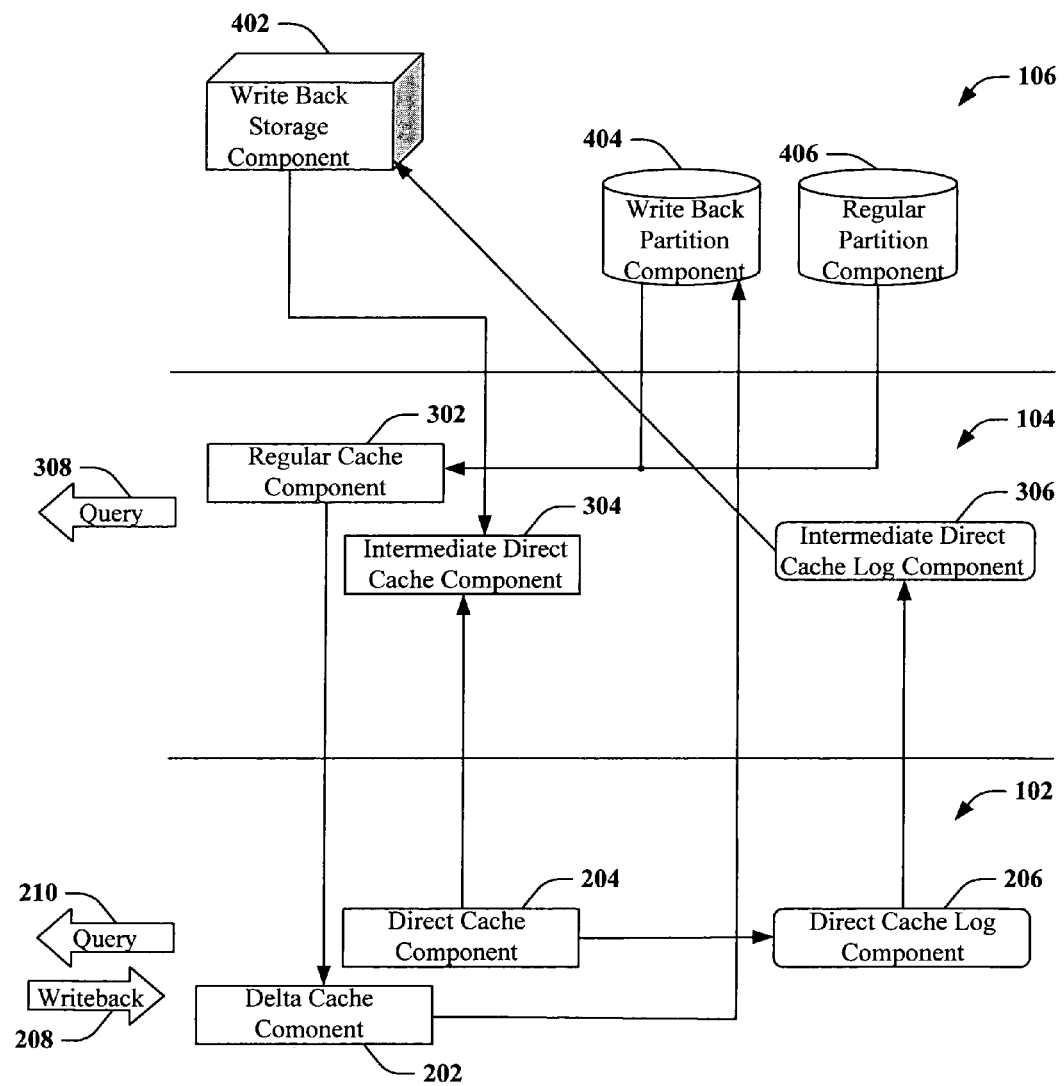
FIG. 4 illustrates a block diagram of storage level components according to an aspect of the invention.

Referring now to FIG. 4 illustrated are components of a storage layer 106 that facilitates direct write back in accordance with an aspect of the invention. The storage layer 106 components interface with both the intermediate layer 104 components and the session layer 102 components to provide system direct write back capabilities. The storage layer 106 includes a write back storage component 402, a write back partition component 404, and a regular partition component 406. The write back storage component 402 receives information from the intermediate direct cache log component 306 and copies the data to the direct cache component 304 where the information can be further manipulated.

Direct write back data is received from the delta cache 202 in the session level 102 and stored in a separate write back partition component (store) 404. Each write back value is retained with the values included in the original write back.

The delta information is written or stored in the write back partition component 404 to facilitate system update and/or to clean any affected data that might be contained in the delta cache 202. The delta information can be converted from the write back partition component 404 to the regular partition component 406 if the original data is to be changed permanently. After a structural change, the direct write back data can be processed to repopulate the cube.

Write back occurs in the session layer 102 and depending on the allocation settings of the write back the session can calculate on the delta cache 202 (M2cache) or the direct cache 204 and 304. When the information is to be updated, the delta cache 202 is moved to a server, locking the cache and storage. The data of the cache is written to a write back partition 404 where the caches are updated and/or cleaned with the affected data. At a substantially similar time, the direct cache data is moved to the server and locked.

Information processing can be performed wherein a cube is updated based upon cube specifications and where one or more cell updates can consist of manipulations at the tuple or row level. As optional other data may be used to update the cells and can be expressed in the form Use_ Equal_ Allocation|Use_Equal_Increment|Use_Weighted_Allocation [By <weight value_expression>]|Use_Weighted_Increment [By <weight value_expression>]]|Use_No_Allocation]. Where direct write back is indicated with the Use_No_Allocation keyword.

Changes that do not have an effect on direct write back include any process type of the cube (its measure groups or its dimensions); adding a new dimension; deleting a dimension (which is not referenced by a write back); adding, modifying or removing a hierarchy; and adding a new measure. In addition, attributes can be added to any dimension. By way of illustration and not limitation, a budgeting scenario will be discussed. A cube may include a hierarchy of sales data for each individual store broken down by year(s)/month(s)/week(s). The cube contains the individual stores that are located in the Seattle, Wash. area and the data rolls the Seattle stores up into the northwest region. When the budget for a particular store or for the entire Seattle region is desired, the user can query for this data and receives the data associated with the northwest region in the form of write back data. However, if the stores are reorganized and a finer granular detail than "northwest region" is desired, for example, the user now wants to budget by state rather than region, the write back record stays the same but now the system lists Seattle in Washington rather than in the northwest region. The direct write back system provides the proper rolled up numbers because the direct write back is not lost when some of the dimensions are restructured. The data including the stores in Washington is output to the user in the form of a "what-if" query. If the user wants to revert back to region information, the dimension can be modified in a similar manner.

Changes that cannot be made without removing the write back data include deleting an attribute or its attribute hierarchy where the attribute is included in a write back (either explicitly or by removing its parent dimension). Additional changes that cannot be made without removing the write back data include deleting a measure included in a write back, adding an attribute without an all level to a dimension included in a write back, and changing the dimension granularity when the dimension was included in a write back.

The subject invention (e.g., in connection with direct write back) can employ various artificial intelligence based schemes for carrying out various aspects thereof. For example, a process for determining whether data should be aggregated (e.g. rolled up) or de-aggregated (e.g. rolled down) in the cube hierarchy can be facilitated via an automatic classifier system and process. Such classifier system and process can be used in conjunction with any of the approaches described herein.

A classifier is a function that maps an input attribute vector, $X=(x_1, x_2, x_3, x_4, \ldots x_n)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a user desires to be automatically performed. In the case of direct write back, for example, attributes can be appropriate aggregation functions such as mathematical functions and/or values, or other data-specific attributes derived from the cell value that was changed, and the classes are categories or areas of interest such as adding, deleting, and/or modifying dimensions and/or hierarchies.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to, training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., using generic training data) as well as implicitly trained (e.g., by observing user behavior, receiving extrinsic information). For example, SVMs are configured using a learning or training phase within a classifier constructor and feature selection module. Thus, the classifier(s) can be used to automatically perform a number of functions, including but not limited to determining when a event, such as update to a data cell, has occurred according to a predetermined criterion or criteria.

Figure 5:
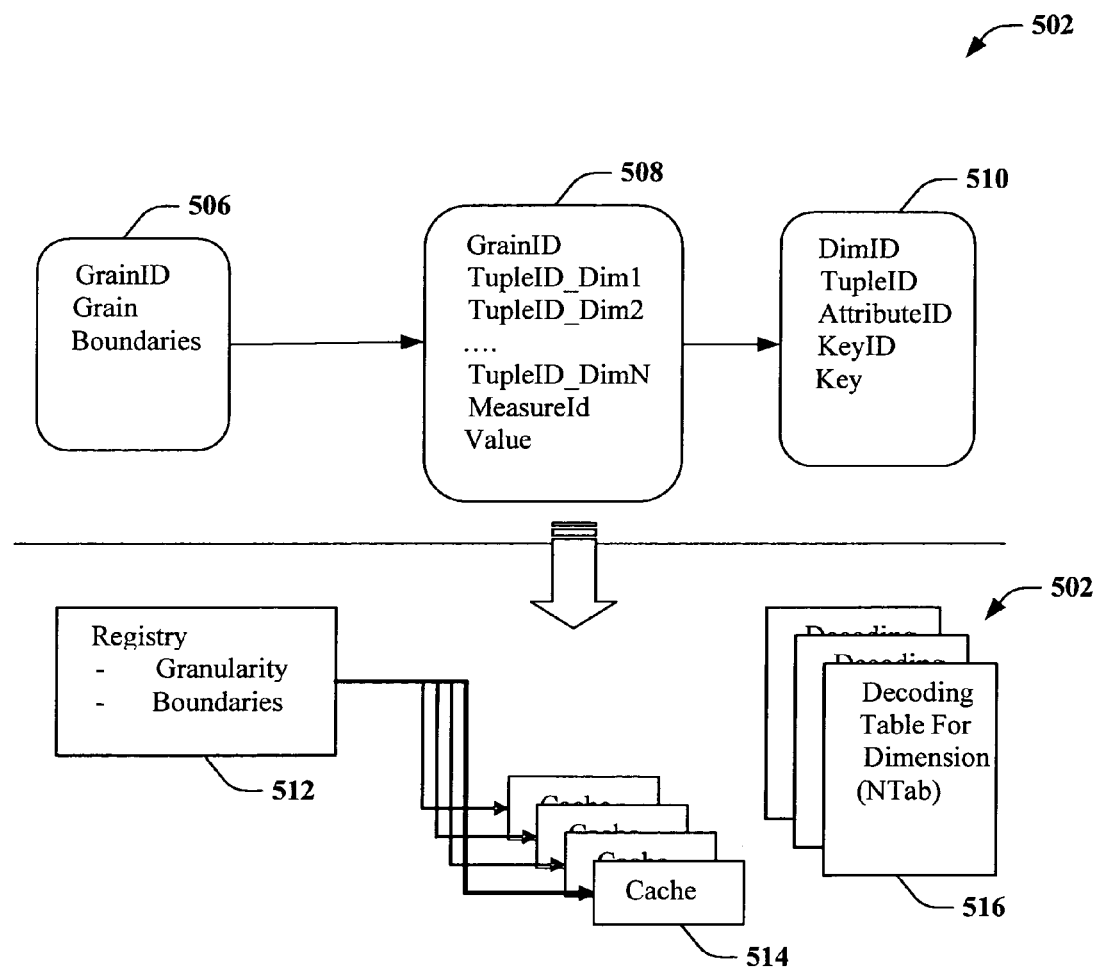
FIG. 5 illustrates a block diagram structure for a partition that facilitates direct write back in accordance with an aspect of the invention.

FIG. 5 illustrates a block diagram structure for a partition that facilitates direct write back in accordance with an aspect of the invention. The upper partition level 502 includes data tables 506, 508, and 510 that include look up tables that provide information regarding granularity and various identification features relating to cell information. For example, data relating to table 506 include grain identification (GrainID), grain, and boundaries. Table 508 includes grain identification (GrainID), tuple identifications (TupID_Dim1, TupleID_Dim2, . . . TupleID_DimN), measure identification (MeasureId) and value. Table 510 contains dimension identification (DimID), tuple identification (TupleID), attribute identification (AttributeID), key identification (KeyId) and key. This information is output to the direct cache level 504.

The direct cache level 504 includes a registry 512 based on granularity and provides aggregations with extensions in order to keep these boundaries for every attribute. The data from the registry is maintained in at least one cache 514 for every granularity and includes cached records and hash tables for record access. The data in this cache(s) 514 is discarded when system memory becomes low and allows the data to be reloaded on demand. The cache 514 keeps the data for a given granularity and compresses to zero any attribute that is not valid for the current granularity. The decoding table for Dimension or NTab 516 per dimension contains the not granular Taupe definitions and provides compression of the data. The decode table provides a fast decoding path to convert write back data from storage to cache format without requiring table look ups.

Upon server restart, the system opens the granularity and decoding table allowing the system to immediately respond to query results if those results do not affect the granularity requested. If the registry detects that data for a particular granularity is requested by the query, the system sends the query to storage and converts the result to direct cache and returns it as a query result. In this case, the query result will be presented as part of data caches 514. The first look up is to the direct cache and if the cell is not found, then the regular cache is looked to for that cell.

Figure 6:
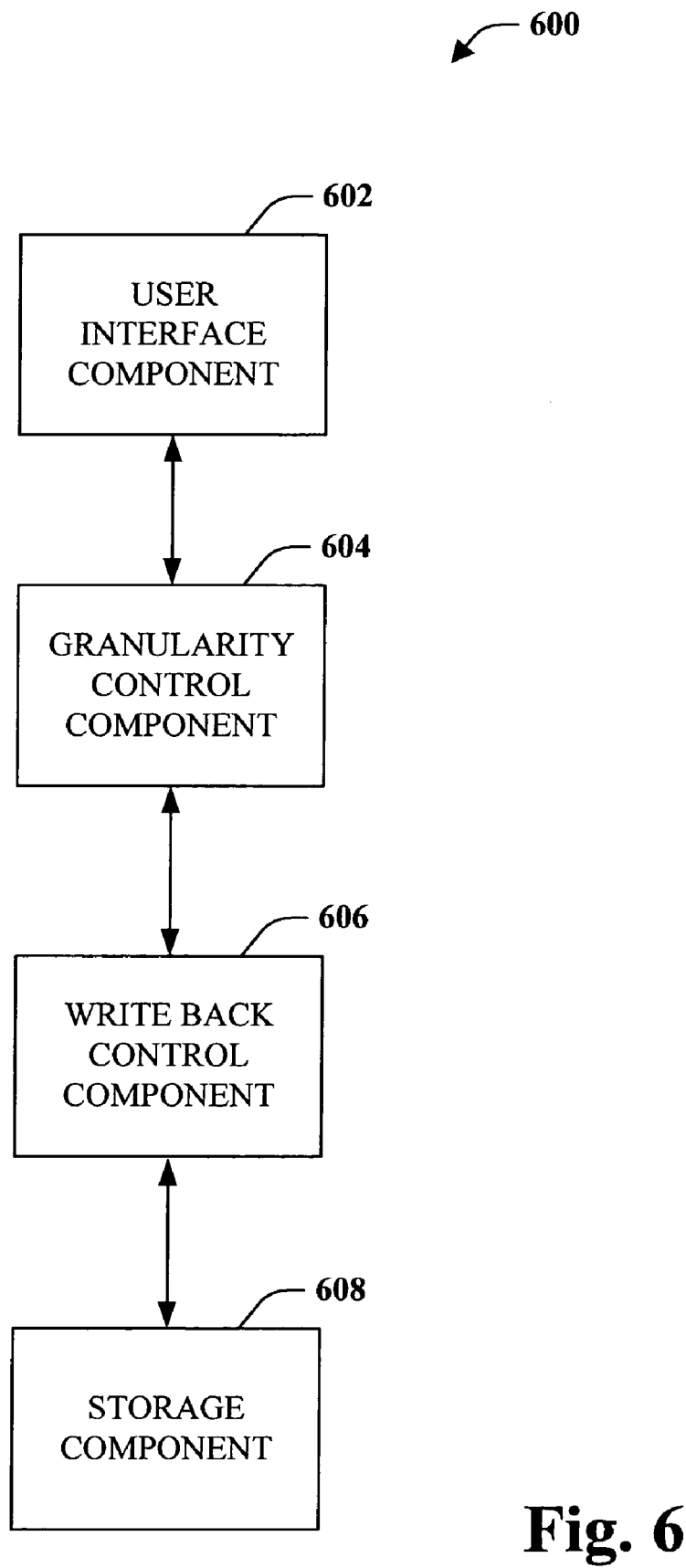
FIG. 6 illustrates a block diagram of a system that facilitates direct write back according to an aspect of the subject invention.

FIG. 6 illustrates a block diagram of a system 600 that includes a user interface component 602, a granularity control component 604, a write back control component 606 and a storage component 608 that interface to facilitate direct write back according to an aspect of the subject invention. The user interface component 602 provides selection of information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the invention is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The user interface component 602 interfaces with the granularity control component 604 that determines the level of granularity of data that is being manipulated and if direct write back is desired. For example, the granularity of the data can be at the lowest level of the cube, which has the highest amount of detail. The granularity of the data can be at an upper level of the cube, where each level up from the lowest level indicates a lower amount of detail in its associated data. The granularity control component further provides aggregation of the data at the higher levels from detailed data provided by the lowest cell level(s).

When data at a lower cell level is changed (e.g. through a what-if query), the write back control component 606 determines the delta associated with that change and the delta is stored in a delta cache. This allows the desired changes to be performed without affecting the original data of the cube. This also allows data at a higher aggregate level to be manipulated and changed without corrupting the integrity of the data below it. Storage component 608 is where the system originally pulls the data from, this original cell data is not changed during direct write back and is only changed and/or updated when instructed by a user to update the data. Thus, after a "what-if" query is performed, if the user desires that information to be the saved information, a request is sent and the new information is stored on the storage component 608.

According to another aspect of the invention, data can also be manipulated at a lower level (higher granularity) without the data being aggregated up to a higher level. By way of illustration and not limitation, if a user is making a budget and enters $1,000.00 for each month at the leaf level, the system aggregates this amount as $12,000.00 for the year 2005. Conversely, if the user enters $12,000 for the year 2005, the system allocates that information down to January through December. This down allocation may be divided equally among the months of the year or based upon some other factor, such as criteria indicating that January receives a different value than December, etc. Alternatively and/or additionally, if the user enters $1000 for the year 2005, this value is stored at the year level and there is no allocation performed. The $1000 value is stored in the direct write back data in the keys of the year attributes. In this example, the $1000 is stored by the key to year 2005. This type of storing, without allocation, does not change the data in the lower levels of the hierarchy, thus increasing system performance.

Figure 7:
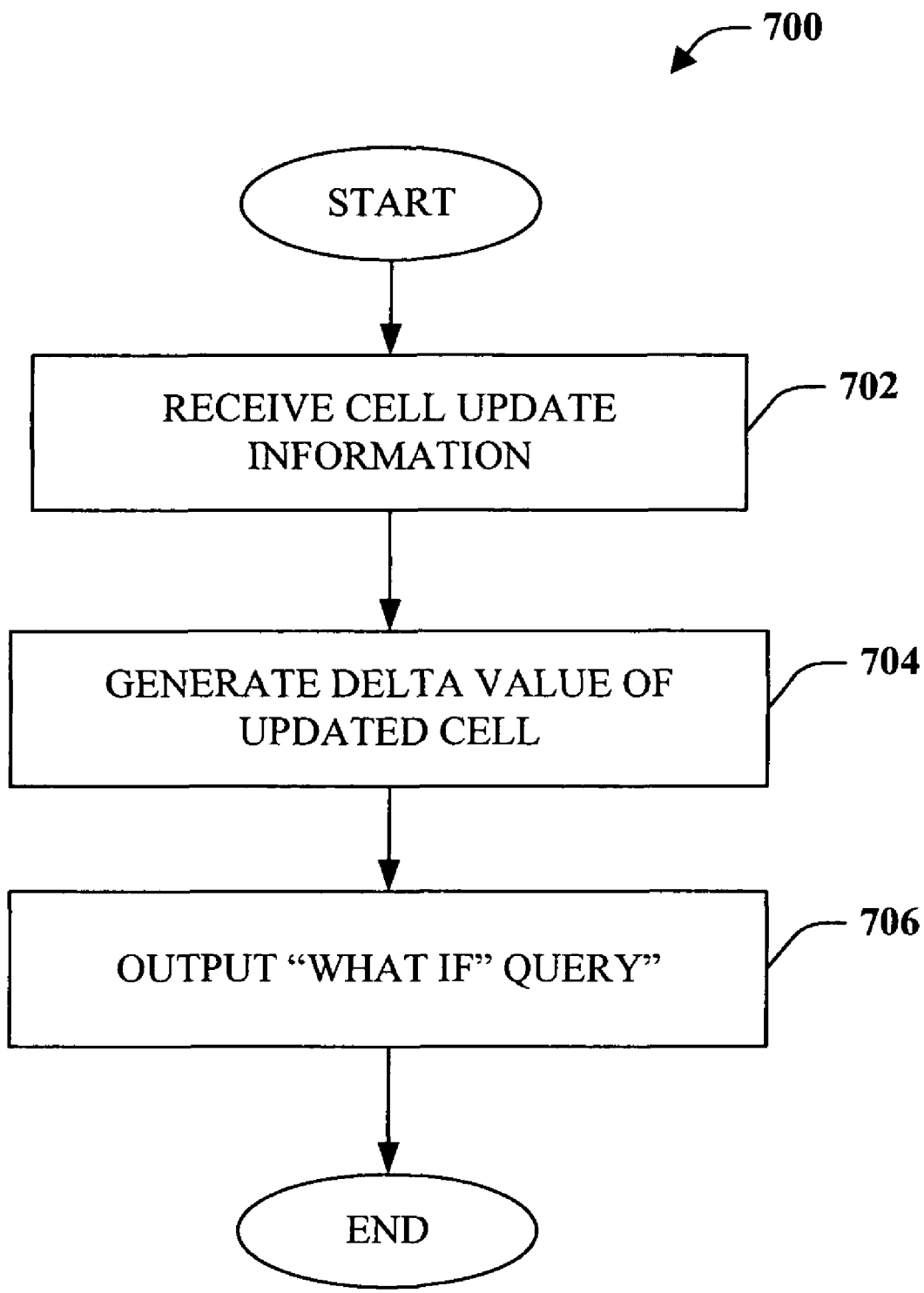
FIG. 7 illustrates a block diagram of a methodology for direct write back in accordance with an aspect of the invention.
Figure 8:
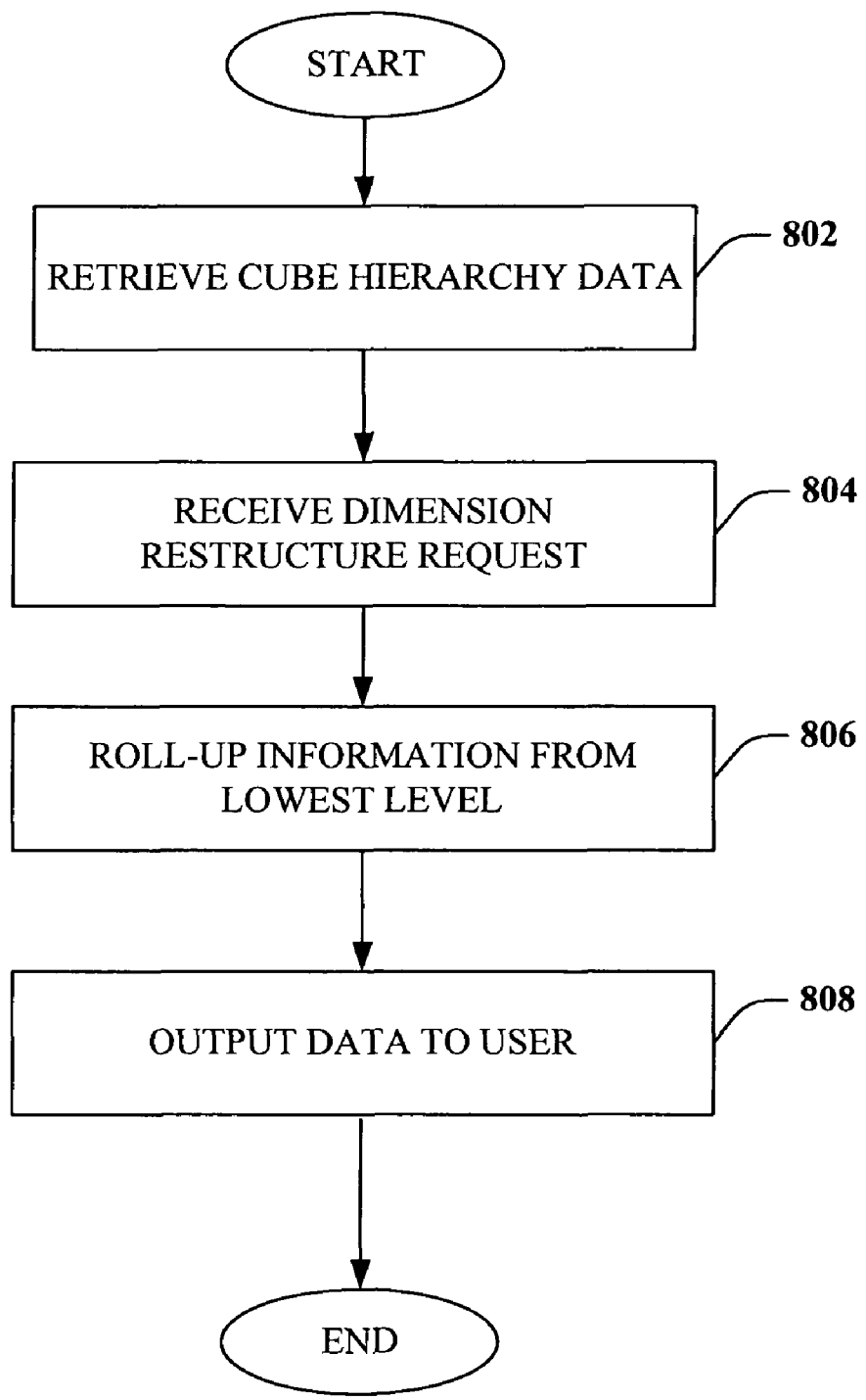
FIG. 8 illustrates a block diagram of a methodology for restructuring dimensions utilizing direct write back in accordance with an aspect of the invention.

In view of the exemplary systems shown and described above, methodologies, which may be implemented in accordance with one or more aspects of the present invention, will be better appreciated with reference to the diagram of FIGS. 7 and 8. While, for purposes of simplicity of explanation, the methodology is shown and described as a series of function blocks, it is to be understood and appreciated that the invention is not limited by the order of the blocks, as some blocks may, in accordance with the invention, occur in different orders and/or concurrently with other blocks from that shown and described herein. Moreover, not all illustrated blocks may be required to implement a methodology in accordance with one or more aspects of the invention. It is to be appreciated that the various blocks may be implemented via software, hardware, a combination thereof or any other suitable means (e.g. device, system, process, component) for carrying out the functionality associated with the blocks. It is also to be appreciated that the blocks are merely to illustrate certain aspects of the invention in a simplified form and that these aspects may be illustrated via a lesser and/or greater number of blocks.

FIG. 7 illustrates a block diagram of a methodology 700 for direct write back according to an aspect of the invention. The method starts at 702 where cell update information is received. This information can be input by a user and/or entity through, for example, a user interface. The cell update can be performed on any granularity level of a data cube according to an aspect of the invention.

At 704, a delta value is generated for the updated cell independently of other cell data values regardless of the location of such other cell values in the hierarchy. The delta value is the sum of the new value minus the old value. The delta value is retained in a cache, for example, along with the original cell value and/or other data associated with the changed cell value (e.g., time stamp, user identification, . . . ). The delta value is viewable and/or accessible only by the user and/or entity associated with the updated cell request. Other users and/or entities that may be manipulating and/or utilizing the original cell data and/or measurement value at a substantially similar time are not affected by the information associated with the updated cell request for a particular user session. If the user session is terminated, the delta value information is likewise terminated, deleted or otherwise removed. The delta value can be maintained in a log containing the associated cell update request. The log can include the original cell measurement value and other associated values including a time stamp that indicates when the data was altered, a user identification indicating who altered the data, a system identification, etc.

At 706, a query (e.g. a "what-if" query) is returned to the user utilizing the updated cell value. If the user does not want to implement that change, the deltas can be deleted through a direct cache log component that restores the data/measurements to original form. Alternatively and/or additionally, each delta in the sequence can be individually deleted to return to a previously changed value and/or to further manipulate the data. In this way, the user can restore the data to its original value(s) and/or any preceding changed values without accessing the intermediate layer and/or storage layer components.

With reference now to FIG. 8, illustrated is a block diagram of a methodology 800 for restructuring dimensions utilizing direct write back in accordance with an aspect of the invention. The system starts at 802 where cube hierarchy data is retrieved. This data includes data associated with the lowest or leaf level and corresponding higher levels that contain aggregated data based on the leaf level data. At 804, a request to restructure the dimensions associated with a higher level is received. By way of illustration and not limitation, a budgeting scenario will be discussed. A cube may include a hierarchy of sales data for each individual store broken down by year(s)/month(s)/week(s). The cube contains the individual stores that are located in the Seattle, Wash. area and the data rolls the Seattle stores up into the northwest region. When the budget for a particular store or for the entire Seattle region is desired, the user can query for this data and receives the data associated with the northwest region in the form of write back data. However, if the stores are reorganized and a finer granular detail than "northwest region" is desired the dimension can be changed, such as to associate each store with the particular state in which it is located. The method allows this alteration and the write back record stays the same but now lists the Seattle stores in Washington state rather than in the northwest region. The direct write back system provides the proper rolled up numbers at 806 because the direct write back is not lost when some of the dimensions are restructured. The data including the Washington state reference is output to the user at 808.

Figure 9:
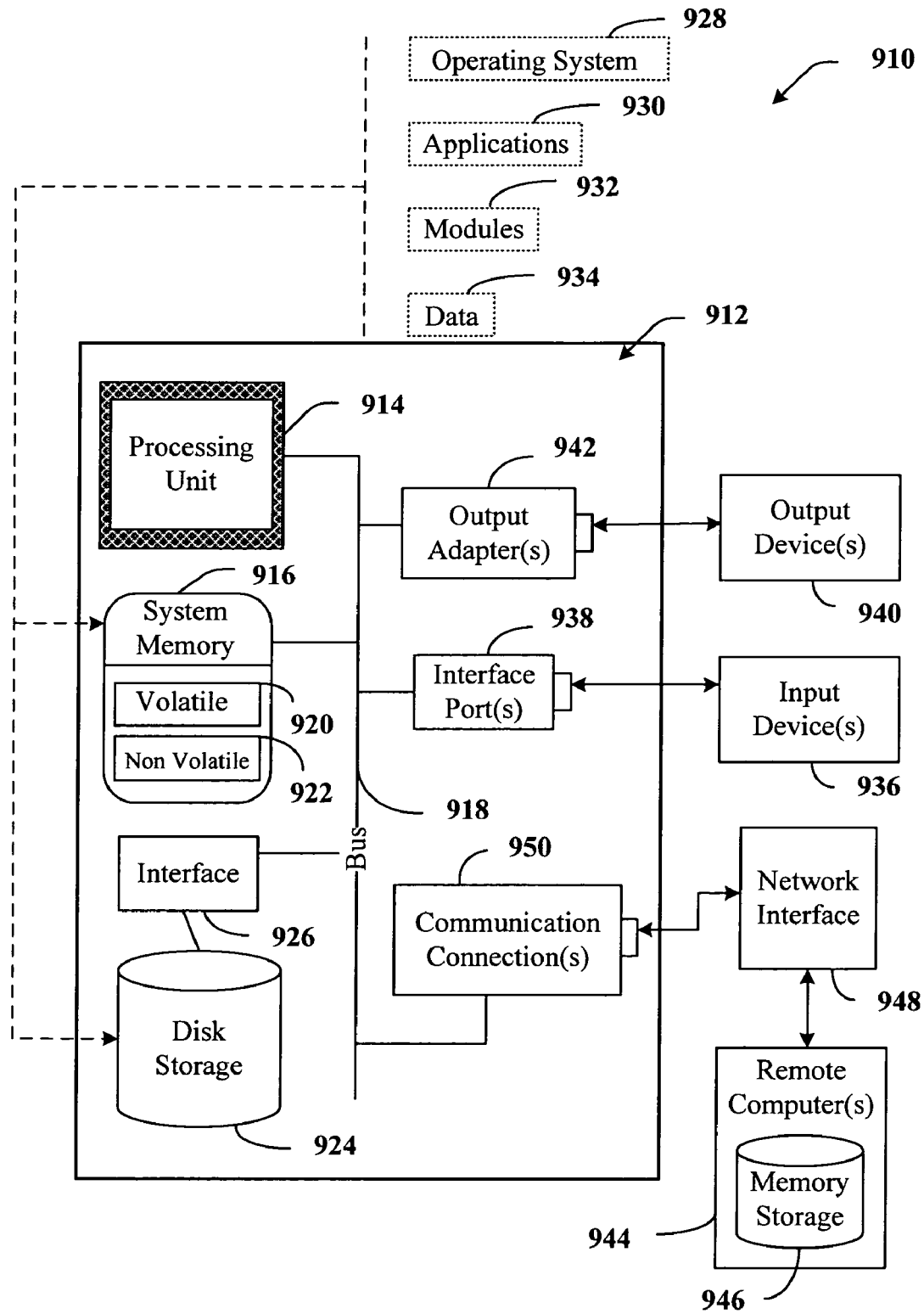
FIG. 9 is an exemplary computing environment that can be utilized in connection with the subject invention.

With reference now to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
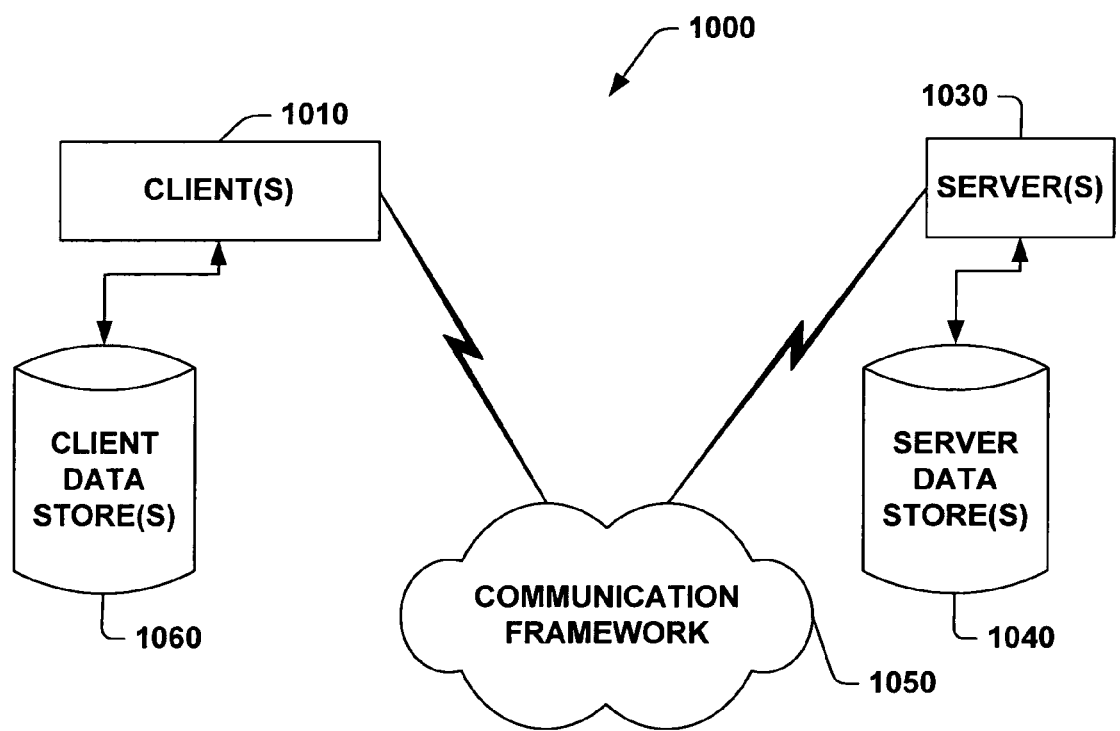
FIG. 10 is an exemplary operating environment that can be employed in connection with the subject invention.

FIG. 10 is a schematic block diagram of a sample-computing environment 1000 with which the invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the invention. It is, of course, not possible to describe every conceivable combination of components or methodologies for purposes of describing the invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. At a computer system including a processor and system memory, a method for querying a data cube, the method comprising:

querying a data cube for results based on a proposed data update to the data cube, portions of the data cube being accessible at different storage layers in a hierarchy of storage layers, the storage layers including a top storage layer, one or more intermediate storage layers, the intermediate layers being configured to output query information relating to a "what if" query without affecting data at any of the storage layers, and a lowest session storage layer, the granularity of the data accessible at each layer varying from more granular at the session storage layer to less granular at the top storage layer, wherein data at a higher layers is aggregated from data at lower layers and data at lower layers is disaggregated from data at higher layers, the storage hierarchy being separate from any dimensional hierarchy of the data cube, wherein querying further comprises receiving a "what if" query from a user, the "what if" query including data for modifying a cell data value of a first cell in a data cube so as to overwrite a current cell data value in the first cell with an updated cell data value, the first cell accessible at a specified storage layer within the hierarchy of storage layers;

maintaining original data cell information for the first cell in a write back data partition, wherein changed data values generated as a result of the "what if" query are stored in a session cache;

inferring one or more actions that the user desires to be performed based on a classifier function that maps a user input to a confidence that the input belongs to a certain class of inputs;

determining a delta value for the first cell, the delta value being the difference between the updated cell data value and the current cell data value;

determining one or more additional delta values for one or more additional cell data values respectively based on the determined delta value, each additional cell data value being associated with an additional cell, the one or more additional cells being accessible at storage layers differing from the specified storage layer in the hierarchy of storage layers, at least one of the one or more additional cells being accessible at a storage layer above the specified storage layer;

the processor updating the first cell with the updated cell data value in isolation from the other one or more additional cells data values, wherein the updating is performed as a result of the action inference and is performed at a higher granularity level than the level at which the original data was entered via the "what if" query and is performed without aggregating the updated cell data value with cell data values of other cells at the specified storage level for access at storage layers above the specified storage layer and without deaggregating the updated cell data value for access at storage layers below the specified storage layer; and outputting the delta value to the user as a result of the "what if" query.

2. The method of claim 1, further comprising:

associating related data with the determined delta value; and storing the determined delta value and associated data in a session cache.

3. The method of claim 2, the related data is at least one of a user identification, a time stamp or a system identification.

4. The method of claim 1, further comprising:

deleting the determined delta value; and returning the cell data value to the current data value.

5. The method as recited in claim 1, wherein updating the first cell with the updated cell data value in isolation from the other one or more additional cells data values comprises an act of updating a cell at the lowest session storage layer without aggregating the updated cell data values of other cells at the specified storage level into a further cell accessible at an intermediate storage layer.

6. The method as recited in claim 1, wherein updating the first cell with the updated cell data value in isolation from the other one or more additional cells data values comprises an act of updating a cell at the lowest session storage layer without aggregating the updated cell data values of other cells at the lowest session storage layer into a further cell accessible at the top storage layer.

7. The method as recited in claim 1, wherein updating the first cell with the updated cell data value in isolation from the other one or more additional cells data values comprises an act of updating a cell at an intermediate storage layer without aggregating the updated cell data values of other cells at the intermediate storage layer into a further cell accessible at the top storage layer.

8. The method as recited in claim 1, wherein updating the first cell with the updated cell data value in isolation from the other one or more additional cells data values comprises an act of updating a cell at an intermediate storage layer without deaggregating the updated cell data value to one or more further cells accessible at the lowest session storage layer.

9. The method as recited in claim 1, wherein updating the first cell with the updated cell data value in isolation from the other one or more additional cells data values comprises an act of updating a cell at the top storage layer without deaggregating the updated cell data value to one or more further cells accessible at an intermediate storage layer.

10. A computer program product for use at a computer system, the computer program product for implementing a method for querying a data cube the computer program product comprising one or more computer storage media having stored thereon computer-executable instructions that, when executed at a processor, cause the computer system to perform method, including the following:

querying a data cube for results based on a proposed data update to the data cube, portions of the data cube accessible at different storage layers in a hierarchy of storage layers, the storage layers including a top storage layer, one or more intermediate storage layers, the intermediate layers being configured to output query information relating to a "what if" query without affecting data at any of the storage layers, and a lowest session storage layer, the granularity of the data accessible at each layer varying from more granular at the session storage layer to less granular at the top storage layer, wherein data at a higher layers is aggregated from data at lower layers and data at lower layers is disaggregated from data at higher layers, the storage hierarchy separate from any dimensional hierarchy of the data cube, wherein querying further comprises receive a "what if" query from a user, the "what if" query including data for modifying a cell data value of a first cell in a data cube so as to overwrite a current cell data value in the first cell with an updated cell data value, the first cell accessible at a specified storage layer within the hierarchy of storage layers;

maintaining original data cell information for the first cell in a write back data partition, wherein changed data values generated as a result of the "what if" query are stored in a session cache;

inferring one or more actions that the user desires to be performed based on a classifier function that maps a user input to a confidence that the input belongs to a certain class of inputs;

determine a delta value for the first cell, the delta value being the difference between the updated cell data value and the current cell data value;

determine one or more additional delta values for one or more additional cell data values respectively based on the determined delta value, each additional cell data value being associated with an additional cell, the one or more additional cells being accessible at storage layers differing from the specified storage layer in the hierarchy of storage layers, at least one of the one or more additional cells being accessible at a storage layer above the specified storage layer;

update the first cell with the updated cell data value in isolation from the other one or more additional cells data values, wherein the updating is performed as a result of the action inference and is performed at a higher granularity level than the level at which the original data was entered via the "what if" query and is performed without aggregating the updated cell data value with cell data values of other cells at the specified storage level for access at storage layers above the specified storage layer and without disaggregating the updated cell data value for access at storage layers below the specified storage layer; and output the delta value to the user as a result of the "what if" query.

11. The computer program product of claim 10, further comprising computer-executable instructions that, when executed, cause the computer system to:

associate related data with the determined delta value; and
store the determined delta value and associated data in a session cache.

12. The method of claim 11, wherein computer-executable instructions that, when executed, cause the computer system to associate related data with the determined delta value comprise computer-executable instructions that, when executed, cause the computer system to associate at least one of a user identification, a time stamp or a system identification to the determined delta value.

13. The method of claim 10, further comprising computer-executable instructions that, when executed, cause the computer system to:

delete the determined delta value; and
return the cell data value to the current data value.

14. A computer system, the computer system comprising:
system memory;
one or more processors; and
one or more one or more computer storage media having stored thereon computer-executable instructions representing data management modules, the data management modules configured to:

divide portions of a data cube for accessibility at different storage layers in a hierarchy of storage layers, the storage layers including a top storage layer, one or more intermediate storage layers, the intermediate layers being configured to output query information relating to a "what if" query without affecting data at any of the storage layers, and a lowest session storage layer, the granularity of the data accessible at each layer varying from more granular at the session storage layer to less granular at the top storage layer, wherein data at a higher layers is aggregated from data at lower layers and data at lower layers is disaggregated from data at higher layers, the storage hierarchy separate from any dimensional hierarchy of the data cube,;

receive a "what if" query from a user, the "what if" query including data for modifying a cell data value of a first cell in a data cube so as to overwrite a current cell data value in the first cell with an updated cell data value, the first cell accessible at a specified storage layer within the hierarchy of storage layers;

maintain original data cell information for the first cell in a write back data partition, wherein changed data values generated as a result of the "what if" query are stored in a session cache;

inferring one or more actions that the user desires to be performed based on a classifier function that maps a user input to a confidence that the input belongs to a certain class of inputs;
determine a delta value for the first cell, the delta value being the difference between the updated cell data value and the current cell data value;
determine one or more additional delta values for one or more additional cell data values respectively based on the determined delta value, each additional cell data value being associated with an additional cell, the one or more additional cells being accessible at storage layers differing from the specified storage layer in the hierarchy of storage layers, at least one of the one or more additional cells being accessible at a storage layer above the specified storage layer;
update the first cell with the updated cell data value in isolation from the other one or more additional cells data values, wherein the updating is performed as a result of the action inference and is performed at a higher granularity level than the level at which the original data was entered via the "what if" query and is performed without aggregating the updated cell data value with cell data values of other cells at the specified storage level for access at storage layers above the specified storage layer and without disaggregating the updated cell data value for access at storage layers below the specified storage layer; and
output the delta value to the user as a result of the "what if" query.

15. The system as recited in claim 14, further comprising a write back storage component configured to repopulate the data cube with the delta value.

* * * * *